J. K. SHANAMAN.
AUXILIARY SEAT.
APPLICATION FILED JULY 10, 1917.
1,354,137.
Patented Sept. 28, 1920.
2 SHEETS—SHEET 1.
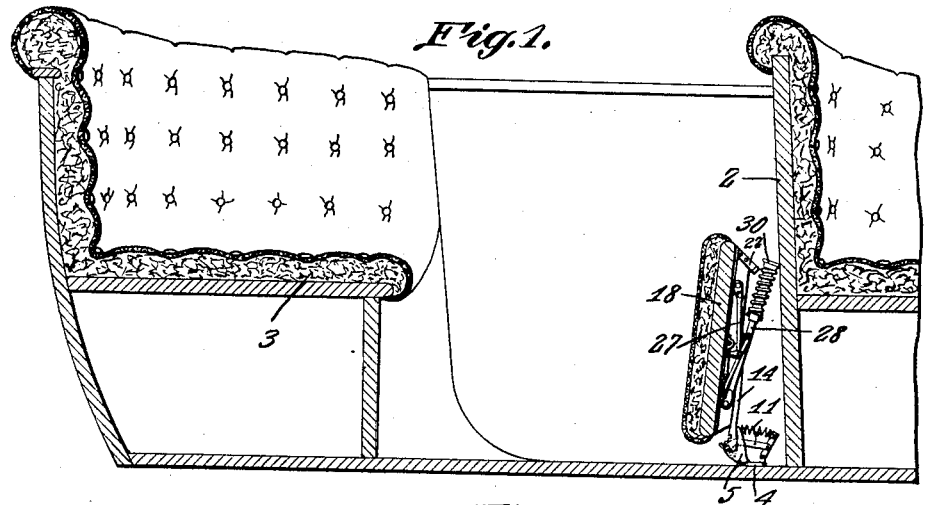
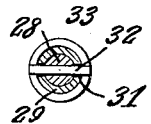
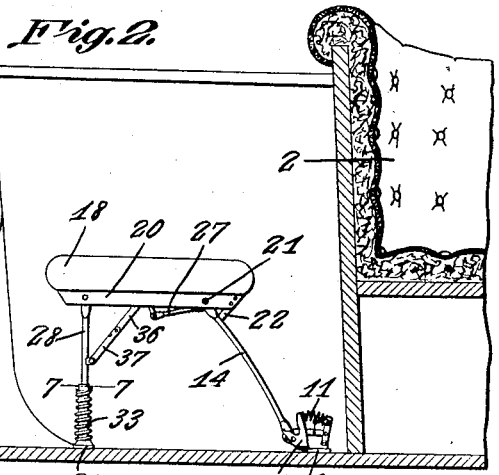
J. K. Shanaman, Inventor
By C. A. Snow & Co.
Attorney J. K. SHANAMAN.
AUXILIARY SEAT.
APPLICATION FILED JULY 10, 1917.
1,354,137.
Patented Sept. 28, 1920.
2 SHEETS—SHEET 2.
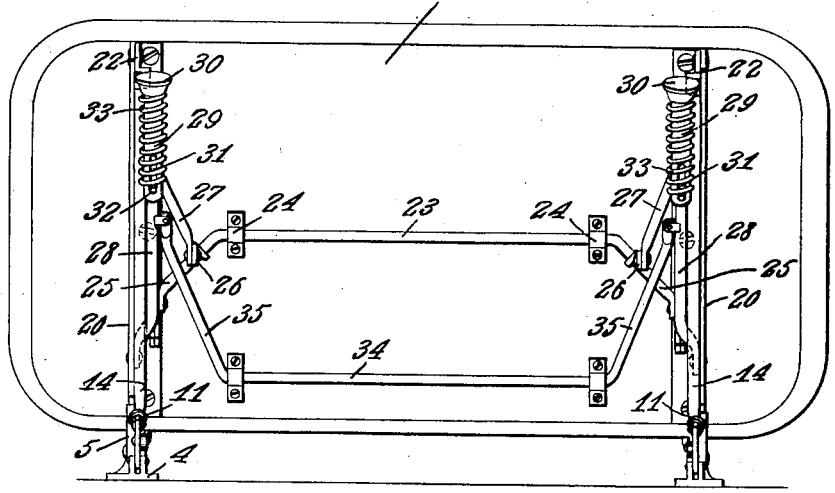
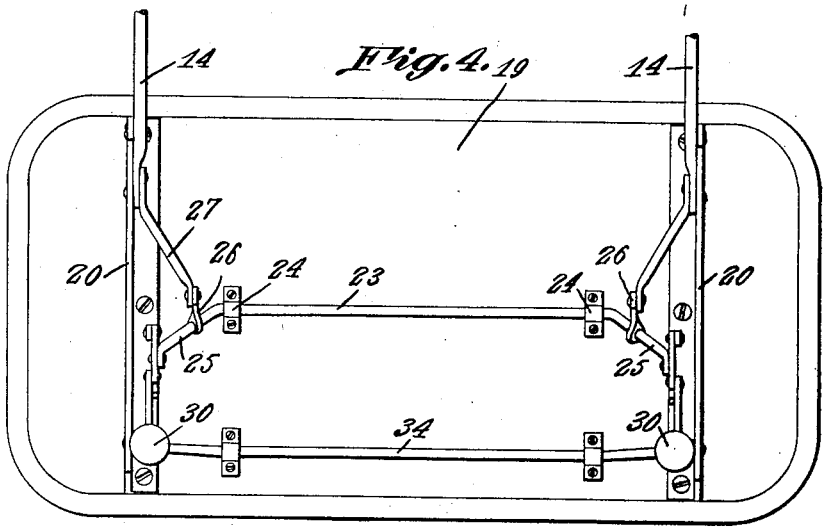
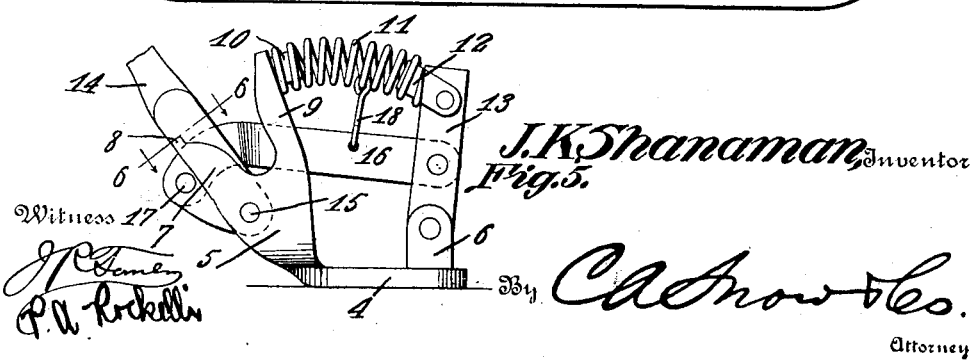
J. K. Shanaman, Inventor

UNITED STATES PATENT OFFICE.

JOHN K. SHANAMAN, OF ANNVILLE, PENNSYLVANIA.

AUXILIARY SEAT.

1,354,137.	Specification of Letters Patent.	Patented Sept. 28, 1920.

Application filed July 10, 1917. Serial No. 179,686.

*To all whom it may concern:*

Be it known that I, JOHN K. SHANAMAN, a citizen of the United States, residing at Annville, in the county of Lebanon and State of Pennsylvania, have invented a new and useful Auxiliary Seat, of which the following is a specification.

This invention relates to auxiliary seats for automobiles, one of the objects of the invention being to provide a seat which can be quickly and compactly folded against the back of the front seat of the vehicle and which is provided with yielding means for facilitating the folding of the seat.

Another object is to provide a seat of this character utilizing front and rear supporting legs which coöperate to fold against the bottom face of the seat when said seat is moved out of active position.

With the foregoing and other objects in view, which will appear as the description proceeds, the invention resides in the combination and arrangement of the parts, and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—

Figure 1 is a vertical longitudinal section through a portion of an automobile body and through the auxiliary seat which is in folded position.

Fig. 2 is a similar view showing the seat in elevation and ready for use.

Fig. 3 is an enlarged front elevation of the seat when folded.

Fig. 4 is a bottom plan view of the seat when in the position shown in Fig. 2.

Fig. 5 is an enlarged side elevation of one of the attaching brackets and adjacent parts.

Fig. 6 is a section on line 6—6 Fig. 5.

Fig. 7 is an enlarged section on line 7—7 Fig. 2.

Referring to the figures by characters of reference, 1 designates a portion of an automobile body having the usual front seat 2 and rear seat 3. The auxiliary seat constituting the present invention is to be placed back of the front seat and includes attaching brackets 4 each of which has a forked arm 5 extending from the rear portion thereof and an ear 6 extending from its front portion. The rear finger 7 of the forked arm has a laterally extending stop lug 8 while projecting forwardly from the front finger 9 of the forked arm is a centering stud 10. This stud projects into one end of an arcuate coiled spring 11 the other end of which engages a stud 12 which projects rearwardly from the upper portion of a lever 13 fulcrumed on the ear 6.

Pivotally connected to each forked arm 5 is a front leg 14, the pivot thereof being indicated at 15. A link 16 is pivotally attached to the leg 14 close to but above the pivot 15, as indicated at 17, and the front end of this link is pivotally atached to the lever 13. A tie 18 connects link 16 to the spring 11, thereby to hold the spring in position.

Attached to the side portion of the bottom of the auxiliary seat 19 are angle strips 20 and the upper end of each of the links 14 is pivotally connected as at 21 to one of these angle strips. Stops 22 extend from the front ends of the angle strips and are designed to engage the legs 14 and thus limit the relative movement of the parts when the seat is set up for use.

Extending transversely of the bottom of seat 19 adjacent its center is a shaft 23 mounted for rotation in bearings 24. This shaft is provided at each end with a crank arm 25 from which projects a finger 26 connected, by links 27 to the adjacent leg 14.

Pivotally connected to the rear portions of each angle strip 20 is a rear leg 28 the lower portion of which projects into a sleeve 29 having a foot 30. A longitudinal slot 31 is formed in the sleeve and receives a stop pin 32 extending through the leg 28. A coiled spring 33 is mounted on the sleeve and bears at one end against the foot 30 and at its other end against the pin 32 and thus acts as a cushion to retard the sliding movement of the leg 28 in the sleeve 29.

A shaft 34 is journaled on the bottom of the seat near its rear edge and substantially in line with the pivots of the legs 28 and this shaft has crank arms 35 which are connected to the legs 28 and constitute lateral braces.

Pivotally connected links 36 and 37 are attached to leg 28 and angle strip 20 respectively and constitute a foldable brace for holding the leg 28 extended downwardly from the seat. The crank arms 25 are fixedly attached to the links 36 so that when shaft 23 is rotated these links 36 will be moved therewith.

Assuming that the seat is arranged for use, as shown in Fig. 2, when it is desired to fold the seat out of the way, it is first swung upwardly and forwardly about the lower pivots 15 of the legs 14 so as to lift the feet 30 off of the floor. The rear portion of the seat is then swung downwardly and forwardly and this movement of the seat about the pivots 21 will cause the links 27 to thrust against the fingers 26 and cause the crank arms 25 to move toward the bottom of the seat. A corresponding movement of the links 36 will be produced with the result that said links will pull, through the links 37, upon the rear legs 28 and cause said legs to swing into position between the angle strips 20. When the rear legs assume these positions the front legs 14 will also have arrived between the angle strips and the seat 19 will therefore be held in substantially vertical position close to and back of the front seat 2, where it will be held by the pressure of springs 11 against levers 13. When it is desired to set up the seat, the lower edge of the seat 19, when in the position shown in Fig. 1, is pulled upwardly, whereupon the action hereinbefore described will be reversed and the legs 28 will swing downwardly to the positions shown in Figs. 2 and 4 while the springs 11 will be placed under compression and so held by the weight of the seat.

It is to be understood that various changes may be made in the construction and arrangement of the parts of the device without departing from the scope of the invention as set forth in the claims.

What is claimed is:—

1. An auxiliary seat including front and rear legs pivotally connected to the seat, a crank shaft upon the front and rear legs for swinging the legs against one face of the seat when the seat is swung downwardly and forwardly relative to the front legs, and spring controlled lever and link connections between the front legs and the supporting structure for holding the seat yieldingly in folded position.

2. The combination with a seat and front legs pivotally connected thereto, of rear legs pivotally connected to the seat, links attached thereto and constituting foldable braces, and means operated by the downward and forward swinging of the seat relative to the front legs for shifting the links to fold the rear legs against the seat, said means including a shaft having crank arms fixedly connected to the links, and link connections between said shaft and the front legs.

3. The combination with a seat and front and rear legs pivotally connected thereto, of attaching brackets, pivotal connections between said brackets and the front legs, a lever mounted on each bracket, a compression spring between each lever and its bracket, a link connection between each lever and one of the front legs, a crank shaft upon the seat, and a link connection between the crank shaft and the front and rear legs for folding the rear legs against the bottom of the seat during the downward and forward swinging of the seat relative to the front legs.

In testimony that I claim the foregoing as my own, I have hereto affixed my signature in the presence of two witnesses.

JOHN K. SHANAMAN.

Witnesses:
G. K. SHANAMAN,
H. E. BREWER.